United States Patent
Hong et al.

(10) Patent No.: US 9,081,444 B2
(45) Date of Patent: Jul. 14, 2015

(54) TOUCH DISPLAY APPARATUS AND METHOD OF DETERMINING TOUCH POSITION USING THE SAME

(75) Inventors: Won-ki Hong, Suwon-si (KR);
Guk-Hyun Kim, Yongin-si (KR);
Seung-Ho Nam, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 219 days.

(21) Appl. No.: 13/619,475

(22) Filed: Sep. 14, 2012

(65) Prior Publication Data

US 2013/0127786 A1 May 23, 2013

(30) Foreign Application Priority Data

Nov. 18, 2011 (KR) .................. 10-2011-0120764

(51) Int. Cl.
*G06F 3/042* (2006.01)

(52) U.S. Cl.
CPC ...... *G06F 3/042* (2013.01); *G06F 2203/04109* (2013.01)

(58) Field of Classification Search
CPC .......... G06F 3/042; G06F 2203/04109; G06F 3/0421; G06F 3/0423; G06F 3/0428
USPC ................ 345/173–179; 178/18.01–18.09
See application file for complete search history.

(56) References Cited

U.S. PATENT DOCUMENTS

| | | | |
|---|---|---|---|
| 6,501,528 B1* | 12/2002 | Hamada | 349/158 |
| 7,085,060 B2* | 8/2006 | Matsushita et al. | 359/599 |
| 2003/0058632 A1* | 3/2003 | Maeda et al. | 362/31 |
| 2006/0098004 A1* | 5/2006 | Cok | 345/207 |
| 2006/0146207 A1* | 7/2006 | Cho et al. | 349/12 |
| 2006/0232830 A1* | 10/2006 | Kobayashi | 358/448 |
| 2008/0158181 A1 | 7/2008 | Hamblin et al. | |

FOREIGN PATENT DOCUMENTS

| | | |
|---|---|---|
| JP | 2010086510 A | 4/2010 |
| KR | 20100061941 A | 6/2010 |
| KR | 200450357 Y1 | 9/2010 |

* cited by examiner

*Primary Examiner* — Premal Patel
(74) *Attorney, Agent, or Firm* — Cantor Colburn LLP

(57) ABSTRACT

A touch display apparatus includes a first substrate, a second substrate, a light emitting part, a light receiving part and a light transmitting element. The second substrate faces the first substrate. The light emitting part is adjacent to a first side of the first substrate, and generates and emits light to the first substrate. The light receiving part is adjacent to a first side of the second substrate at a same side of the touch display apparatus as the first side of the first substrate, and receives light from the second substrate. The light transmitting element connects a second side of the first substrate opposing the first side of the first substrate to a second side of the second substrate opposing the first side of the second substrate.

27 Claims, 10 Drawing Sheets

TOUCH DISPLAY APPARATUS AND METHOD OF DETERMINING TOUCH POSITION USING THE SAME This application claims priority to Korean Patent Application No. 10-2011-0120764, filed on Nov. 18, 2011, and all the benefits accruing therefrom under 35 U.S.C. §119, the contents of which are herein incorporated by reference in their entirety.

BACKGROUND OF THE INVENTION

1. Field of the Invention

One or more exemplary embodiments of the invention relate to a touch display apparatus and a method of determining a touch position using the touch display apparatus. More particularly, one or more exemplary embodiments of the invention relate to a touch display apparatus recognizing touches on both surfaces of a touch panel and a method of determining a touch position using the touch display apparatus.

2. Description of the Related Art

A display apparatus including a touch panel has been widely used. In the touch panel, a touch signal is inputted by a touch providing means such as a stylus pen, a finger and so on without an additional separate input device such as a remote controller.

Generally, the touch panel recognizes a touch on a single surface of the touch panel. However, as a use of the display apparatus is diversified, the touch panel is required to recognize touches on both surfaces of the touch panel.

Touch panels may be classified into a capacitive type touch panel, a resistive type touch panel and an optical type touch panel according to a touch detecting method.

The optical type touch panel includes a light emitting part and a light receiving part. The optical type touch panel uses a total reflection characteristic of light.

A touch display apparatus employing a conventional optical type touch panel includes a first light emitting part and a first light receiving part to recognize a touch on a first surface of the display panel, and a second light emitting part and a second light receiving part to recognize a touch on a second surface of the display panel. Accordingly, the number of light emitting elements and the number of light receiving elements increase so that a manufacturing cost of the touch display apparatus increases.

BRIEF SUMMARY OF THE INVENTION

One or more exemplary embodiments of the invention provide a touch display apparatus recognizing touches on both surfaces of a touch panel and decreasing a manufacturing cost of the touch display apparatus.

One or more exemplary embodiments of the invention also provide a method of determining a touch position using the touch display apparatus.

In an exemplary embodiment of a touch display apparatus according to the invention, the touch display apparatus includes a first substrate, a second substrate, a first light emitting part, a first light receiving part and a first light transmitting element. The second substrate faces the first substrate. The first light emitting part is adjacent to a first side of the first substrate and emits light to the first substrate. The first light receiving part is adjacent to a first side of the second substrate on a same side of the touch display apparatus as the first side of the first substrate and receives light from the second substrate. The first light transmitting element connects a second side of the first substrate opposing the first side of the first substrate to a second side of the second substrate opposing the first side of the second substrate.

In an exemplary embodiment, the first light emitting part may include a plurality of light emitting elements adjacent to the first side of the first substrate.

In an exemplary embodiment, the first light emitting part may further include a plurality of lenses between the light emitting elements and the first substrate.

In an exemplary embodiment, the first light emitting part may include a first light emitting element at a first end portion of the first side of the first substrate, a second light emitting element at a second end portion of the first side of the first substrate opposite to the first end portion of the first side of the first substrate, and a first light guiding element between the first light emitting element and the second light emitting element and guiding light emitted from the first and second light emitting elements toward the first substrate.

In an exemplary embodiment, the first light guiding element may include a first side wall adjacent to the first substrate, a second side wall opposite to the first side wall and a light guiding pattern on the second side wall.

In an exemplary embodiment, the first side wall may have a convex surface toward the first substrate.

In an exemplary embodiment, the first light receiving part may include a plurality of optical sensors adjacent to the first side of the second substrate.

In an exemplary embodiment, the first light transmitting element connects the second side surfaces of the first substrate and the second substrate to each other by being bonded to the first and second substrates in an optical bonding method.

In an exemplary embodiment, the first light transmitting element, the first substrate and the second substrate may collectively form a single unitary indivisible member.

In an exemplary embodiment, the first light transmitting element may have a cross section of a half circle.

In an exemplary embodiment, the first light transmitting element may have a refractive index substantially same as a refractive indices of the first and second substrates.

In an exemplary embodiment, the touch display apparatus may further include a touch determining part connected to the light receiving part and determining a touch position.

In an exemplary embodiment, the touch determining part may determine whether a touch occurs or not based on a total sum of changes of signal intensities of the light receiving elements.

In an exemplary embodiment, the touch determining part may determine a touch coordinate of an X-axis based on a peak of the changes of the signal intensities of the light receiving elements.

In an exemplary embodiment, the touch determining part may determine a touch coordinate of a Y-axis based on the number of the light receiving elements which sense the touch and the changes of the signal intensities of the respective light receiving elements.

In an exemplary embodiment, the first substrate may overlap the second substrate. The touch display apparatus may further include a first auxiliary layer on a lower surface of the first substrate and a second auxiliary layer on an upper surface of the second substrate.

In an exemplary embodiment, the first substrate may overlap the second substrate. The touch display apparatus may further include a first polarizing plate on an upper surface of the first substrate and a second polarizing plate on a lower surface of the second substrate.

In an exemplary embodiment, the touch display apparatus may further include a first gap between the first substrate and the first polarizing plate, and a second gap between the second substrate and the second polarizing plate.

In an exemplary embodiment, the first substrate may overlap the second substrate.

The touch display apparatus may further include a first polarizing plate on a lower surface of the first substrate and a second polarizing plate on an upper surface of the second substrate.

In an exemplary embodiment, the first substrate may overlap the second substrate. The touch display apparatus may further include a third substrate between the first substrate and the second substrate, the third substrate including a common electrode, and a fourth substrate between the second substrate and the third substrate, the fourth substrate including a pixel electrode.

In an exemplary embodiment, the touch display apparatus may further include a second light emitting part adjacent to a third side of the first substrate adjacent to the first side of the first substrate and emitting light to the first substrate, a second light receiving part adjacent to a third side of the second substrate at a same side of the touch display apparatus as the third side of the first substrate and receiving light from the second substrate, and a second light transmitting element connecting a fourth side of the first substrate opposing the third side of the first substrate to a fourth side of the second substrate opposing the third side of the second substrate.

In another exemplary embodiment of a touch display apparatus according to the invention, the touch display apparatus includes a first substrate, a second substrate, a first light emitting part, a second light emitting part, a light receiving part and a light transmitting element. The second substrate faces the first substrate. The first light emitting part is adjacent to a first side of the first substrate, and generates and emits light to the first substrate. The second light emitting part is adjacent to a first side of the second substrate at a same side of the touch display apparatus as the first side of the first substrate, and generates and emits light to the second substrate. The light receiving part is adjacent to a second side of the first substrate opposing the first side of the first substrate and a second side of the second substrate opposing the first side of the second substrate and receives light from the first and second substrates. The light transmitting element connects the second side of the first substrate to the second side of the second substrate.

In another exemplary embodiment of a touch display apparatus according to the invention, the touch display apparatus includes a first substrate, a second substrate, a first light receiving part, a second light receiving part, a light emitting part and a light transmitting element. The second substrate faces the first substrate. The first light receiving part is adjacent to a first side of the first substrate and receives light from the first substrate. The light emitting part is adjacent to a first side of the second substrate at a same side of the touch display apparatus as the first side of the first substrate and receives light from the second substrate. The light receiving part is adjacent to a second side of the first substrate opposing the first side of the first substrate and a second side of the second substrate opposing the first side of the second substrate, and generates and emits light to the first and second substrates. The light transmitting element connects the second side of the first substrate to the second side of the second substrate.

In an exemplary embodiment of a method of determining a touch position according to the invention, the method includes emitting light to a first side of a first substrate, transmitting the light from a second side of the first substrate opposing the first side of the first substrate to a second side of a second substrate corresponding to the second side of the first substrate, light receiving elements receiving the light from the second substrate at a first side of the second substrate opposing the second side of the second substrate and determining the touch position based on the received light.

In an exemplary embodiment, the determining the touch position may further include determining whether a touch occurs or not based on a total sum of changes of signal intensities of the light receiving elements.

In an exemplary embodiment, determining the touch position may further include determining a touch coordinate of an X-axis based on a peak of the changes of the signal intensities of the light receiving elements.

In an exemplary embodiment, determining the touch position may further include determining a touch coordinate of a Y-axis based on the number of the light receiving elements which sense the touch and the changes of the signal intensities of the respective light receiving elements.

According to one or more embodiment of the touch display apparatus and the method of determining a touch position using the touch display apparatus, the touch display apparatus may recognize touches on both sides of the touch panel and a manufacturing cost of the touch display apparatus may be decreased.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION OF THE INVENTION

Figure 1:
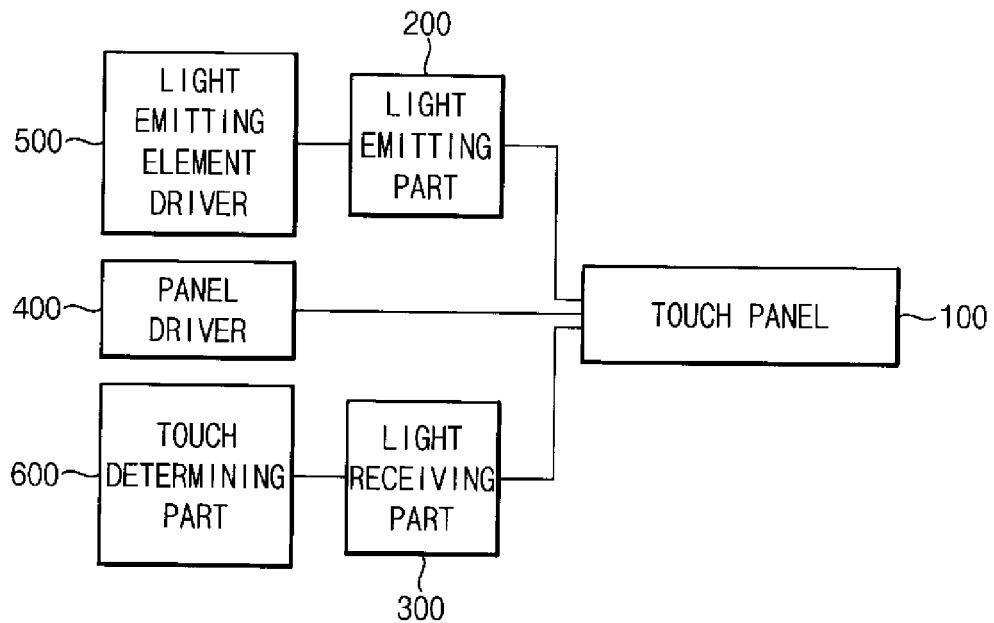
FIG. 1 is a block diagram illustrating an exemplary embodiment of a touch display apparatus according to the invention.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 2:
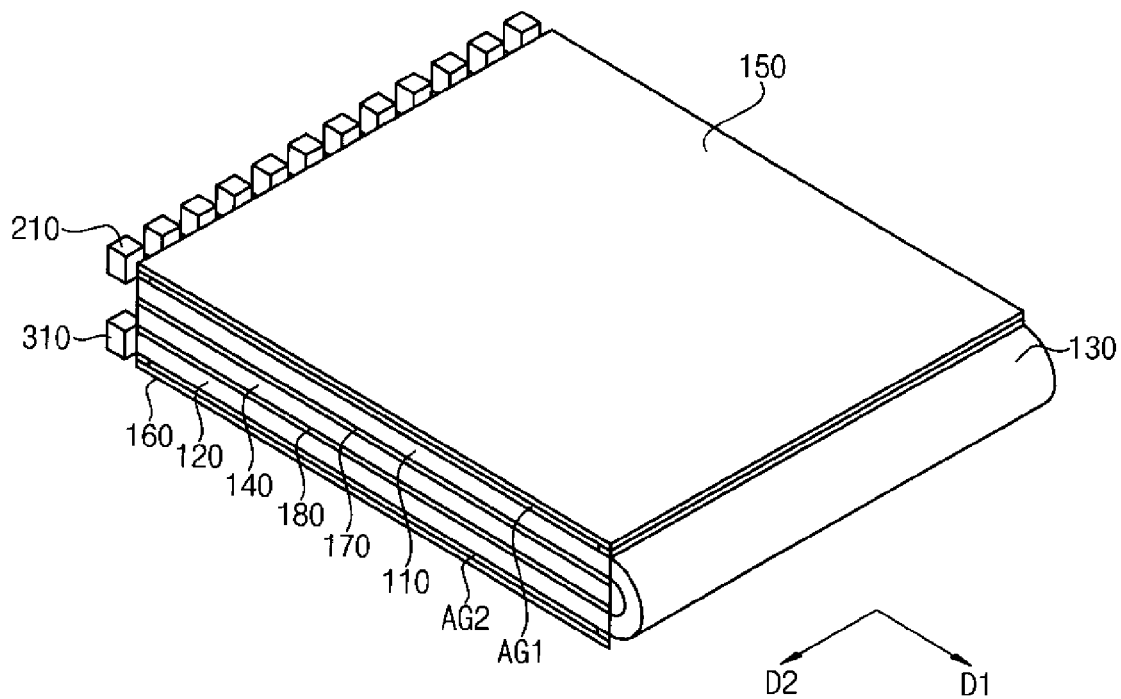
FIG. 2 is a perspective view illustrating an exemplary embodiment of a touch panel, a light emitting part and a light receiving part of the touch display apparatus of FIG. 1.
Figure 3:
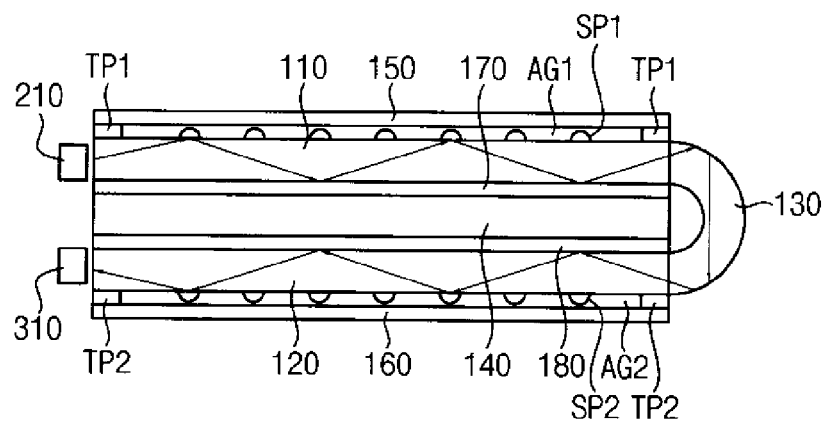
FIG. 3 is a cross-sectional view illustrating the touch panel, the light emitting part and the light receiving part of the touch panel display apparatus of FIG. 1.

FIG. 1 is a block diagram illustrating an exemplary embodiment of a touch display apparatus according to the invention. FIG. 2 is a perspective view illustrating an exemplary embodiment of a touch panel, a light emitting part and a light receiving part of the touch display apparatus of FIG. 1. FIG. 3 is a cross-sectional view illustrating the touch panel, the light emitting part and the light receiving part of the touch display apparatus of FIG. 1.

Referring to FIGS. 1 to 3, the touch display apparatus includes a touch panel 100, a light emitting part 200, a light receiving part 300, a panel driver 400, a light emitting element driver 500 and a touch determining part 600.

The touch panel 100 displays an image. A touch occurs on the touch panel 100. The light emitting part 200 provides light to the touch panel 100. The light receiving part 300 receives light from the touch panel 100. The panel driver 400 drives the touch panel 100. The light emitting element driver 500 drives a plurality of light emitting elements of the light emitting part 200. The touch determining part 600 determines a touch position based on a signal received at a plurality of light receiving elements of the light receiving part 300.

The touch panel 100 includes a first substrate 110, a second substrate 120, a light transmitting element 130 and a light converting element 140.

The light emitting part 200 is disposed along a first side of the first substrate 110. The first substrate 110 guides the light generated and emitted from the light emitting part 200 to the light transmitting element 130. The first substrate 110 guides the light emitted from the light emitting part 200 to the light transmitting element 130 by a total reflection.

The first substrate 110 may include a color filter representing a color in response to the light and a common electrode.

The first substrate 110 may include a glass. Alternatively, the first substrate 110 may include a plastic. The first substrate 110 may include a flexible material.

The first substrate 110 may have a rectangular shape. The first substrate 110 may have a rectangular shape having a longer side substantially parallel to a first direction D1.

The second substrate 120 faces the first substrate 110. The light receiving part 300 is disposed along a first side of the second substrate 120 corresponding to the first side of the first substrate 110. The second substrate 120 guides the light from the light transmitting element 130 to the light receiving part 300. The second substrate 120 guides the light from the light transmitting element 130 to the light receiving part 300 by a total reflection.

The second substrate 120 may include a pixel layer having a plurality of switching elements disposed in a matrix form, and a pixel electrode facing the common electrode. A plurality of gate lines having longitudinal axes extending in the first direction D1, and a plurality of data lines having longitudinal axes extending in a second direction D2 crossing the first direction D1, may be disposed on the second substrate 120.

The second substrate 120 may include a glass. Alternatively, the second substrate 120 may include a plastic. The second substrate 120 may include a flexible material.

The second substrate 120 may have a rectangular shape. The second substrate 120 may have a rectangular shape having a longer side substantially parallel to the first direction D1.

The light transmitting element 130 connects a second side of the first substrate 110 opposing the first side of the first substrate 110 to a second side of the second substrate 120 opposing the first side of the second substrate 120. The light transmitting element 130 may transmit the light from the second side of the first substrate 110 to the second side of the second substrate 120. A continuous light path may be formed from the light emitting element 210, through the first substrate 110, the light transmitting element 130 and the second substrate 120, to the light receiving element 310 as shown in FIG. 3.

The light transmitting element 130 may be bonded to the first substrate 110 and the second substrate 120 in an optical bonding method, such that the light transmitting element 130 is a separate member joined with the first and/or second substrates. Alternatively, the light transmitting element 130 may be integrally formed with the first substrate 110 and/or the second substrate 120, such that the light transmitting element 130 may form a single, unitary, indivisible member with the first substrate 110 and/or the second substrate 120.

The light transmitting element 130 may have a cross section of a half circle. The light transmitting element 130 may have a cross section of a half circle which includes a hole corresponding to a center of the half circle. Alternatively, the light transmitting element 130 may have a cross section of a trapezoid which includes a longer side adjacent to the first and second substrates and a shorter side opposite to the longer side. Alternatively, the light transmitting element 130 may have a cross section of a rectangle.

The light transmitting element 130 may have a refractive index substantially same as one of the first and second substrates 110 and 120. The light transmitting element 130 may have a refractive index substantially same as both the first and second substrates 110 and 120.

The light transmitting element 130 may have a material substantially same as one of the first and second substrates 110 and 120. The light transmitting element 130 may have a material substantially same as both the first and second substrates 110 and 120.

The light converting element 140 is disposed between the first substrate 110 and the second substrate 120. The light converting element 140 controls a light transmittance according to an electric field generated between the pixel electrode and the common electrode of the second substrate 120. In one or more exemplary embodiments, for example, the light converting element 140 may be a liquid crystal layer.

The touch panel 100 may further include a first polarizing plate 150 and a second polarizing plate 160.

The first polarizing plate 150 is disposed over the first substrate 110. The first polarizing plate 150 is separated from the first substrate 110. A first gap AG1, such as filled with air, is between the first substrate 110 and the first polarizing plate 150.

The first polarizing plate 150 may be fixed to a portion of the first substrate 110 through a fixing member, such as an adhesive like a first double-sided tape TP1. A first spacer SP1 may be disposed between the first substrate 110 and the first polarizing plate 150 to maintain a uniform distance between the first substrate 110 and the first polarizing plate 150.

The first polarizing plate 150 transmits light oscillating in a specific direction and absorbs light oscillating in the other directions. The first polarizing plate 150 has a first polarizing axis.

The first polarizing plate 150 may be an anti-reflection polarizing plate decreasing a noise due to an external light.

The second polarizing plate 160 is disposed under the second substrate 120. The second polarizing plate 160 is separated from the second substrate 120. A second gap AG2, such as filled with air, is between the second substrate 120 and the second polarizing plate 160.

The second polarizing plate 160 may be fixed to a portion of the second substrate 120 through fixing member, such as an adhesive like a second double-sided tape TP2. A second spacer SP2 may be disposed between the second substrate 120 and the second polarizing plate 160 to maintain a uniform distance between the second substrate 120 and the second polarizing plate 160.

The second polarizing plate 160 transmits light oscillating in a specific direction and absorbs light oscillating in the other directions. The second polarizing plate 160 has a second polarizing axis. The second polarizing axis of the second polarizing plate 160 may be perpendicular to the first polarizing axis of the first polarizing plate 150.

The second polarizing plate 160 may be an anti-reflection polarizing plate decreasing a noise due to an external light.

The touch panel 100 may further include a first auxiliary layer 170 and a second auxiliary layer 180.

The first auxiliary layer 170 is disposed on a lower surface of the first substrate 110. The first auxiliary layer 170 may have a refractive index lower than the first substrate 110. The first auxiliary layer 170 may have a reflectivity higher than the first substrate 110. A light transmitting efficiency of the first substrate 110 may be increased by the first auxiliary layer 170.

The second auxiliary layer 180 is disposed on an upper surface of the second substrate 120. The second auxiliary layer 180 may have a refractive index lower than the second substrate 120. The second auxiliary layer 180 may have a reflectivity higher than the second substrate 120. A light transmitting efficiency of the second substrate 120 may be increased by the second auxiliary layer 180.

Alternatively, the first and second auxiliary layers 170 and 180 may be omitted.

The light emitting part 200 includes a plurality of the light emitting elements 210. The light emitting elements 210 are disposed along the first side of the first substrate 110 in the second direction D2. The light emitting elements 210 may face a side surface of the first substrate 110. The light emitting element 210 may be a light emitting diode ("LED").

The light emitting part 200 generates and provides light, which is not visible to an observer or outside of the touch display apparatus, to the first substrate 110. The light emitting part 200 may irradiate an infrared ray. The light emitting element 210 may be an infrared LED.

The light receiving part 300 includes a plurality of the light receiving elements 310. The light receiving elements 310 are disposed along the first side of the second substrate 120 in the second direction D2. The light receiving elements 310 may face a side surface of the second substrate 120. The light receiving element 310 may be an optical sensor. The light receiving element 310 may be an infrared optical sensor.

Alternatively, positions of the light emitting part 200 and the light receiving part 300 may be switched with each other compared to FIGS. 2 and 3. In one or more exemplary embodiments, for example, the light emitting part 200 may be disposed along the first side of the second substrate 120, and the light receiving part 300 may be disposed along the first side of the first substrate 110.

The panel driver 400 is connected to the touch panel 100 to drive the touch panel 100. The panel driver 400 may include a gate driver and a data driver. The gate driver and the data driver are connected to the second substrate 120 to provide driving signals to the second substrate 120. The gate driver may provide gate driving signals to the gate lines disposed on the second substrate 120. The data driver may provide data driving signals to the data lines disposed on the second substrate 120.

The light emitting element driver 500 is connected to the light emitting part 200 to drive the light emitting part 200. The light emitting element driver 500 provides driving signals to the light emitting elements 210 of the light emitting part 200.

The touch determining part 600 is connected to the light receiving part 300 to determine a touch position based on the light received at the light receiving part 300. The method of determining the touch position performed by the touch determining part 600 may be explained referring to FIGS. 4, 5A, 5B and 5C in detail.

The touch display apparatus may be a liquid crystal display ("LCD") apparatus. However, the display apparatus of the invention is not limited to the LCD apparatus. In one or more exemplary embodiments, for example, the touch display apparatus may be one of an organic light emitting diode ("OLED") display apparatus, a plasma display panel ("PDP") display apparatus and a LED display apparatus.

The touch display apparatus may be a transparent display apparatus. The touch panel 100 may display an image using an external light.

Figure 4:
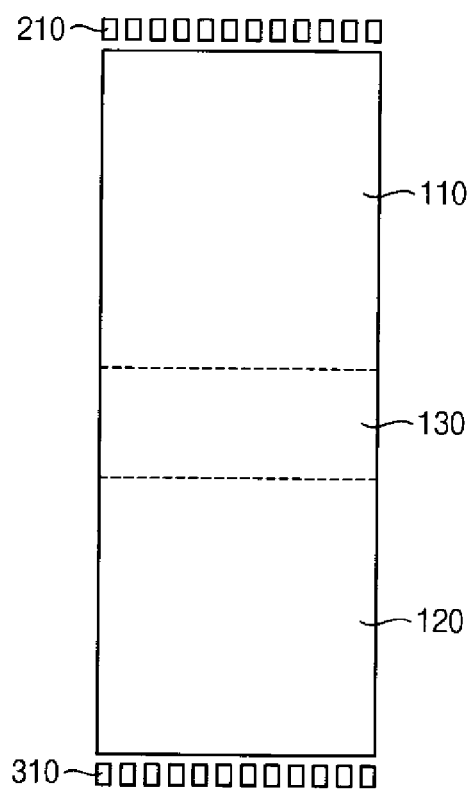
FIG. 4 is a conceptual diagram illustrating the touch panel, the light emitting part and the light receiving part of the touch panel display apparatus of FIG. 1, unfolded to form a single surface.

FIG. 4 is a conceptual diagram illustrating the touch panel, the light emitting part and the light receiving part of the touch display apparatus of FIG. 1, unfolded to effectively form a single surface.

Referring to FIG. 4, the light emitting elements 210 of the light emitting part 200 generate and emit the light to the first substrate 110. The first substrate 110 transmits the light to the light transmitting element 130. The light transmitting element 130 transmits the light to the second substrate 120. The second substrate 120 transmits the light to the light receiving elements 310 of the light receiving part 300.

Figure 5A:
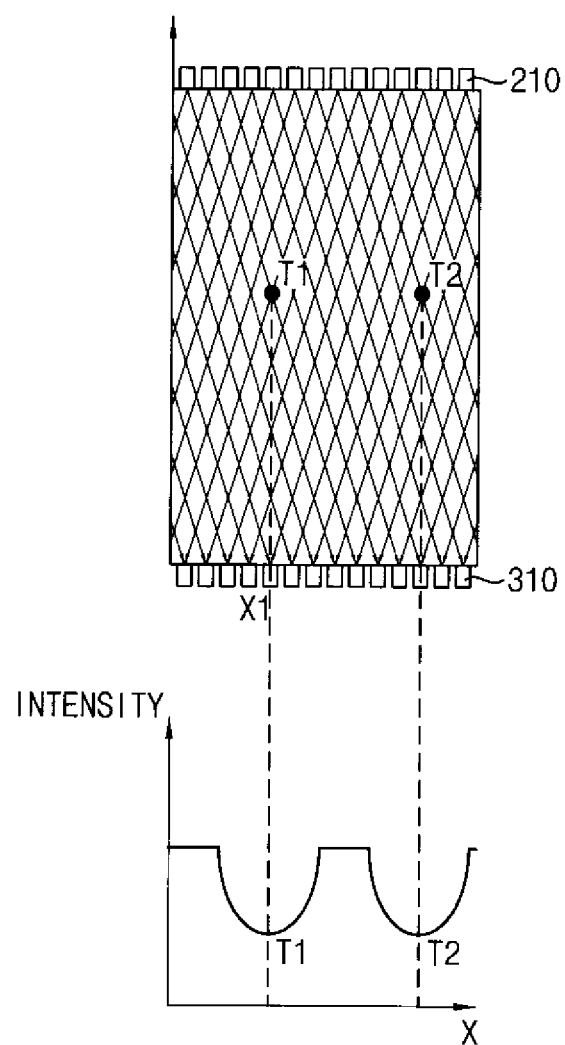
FIG. 5A is a conceptual diagram illustrating an exemplary embodiment of a method of determining a touch coordinate of an X-axis using the touch display apparatus of FIG. 1.

FIG. 5A is a conceptual diagram illustrating an exemplary embodiment of a method of determining a touch coordinate of an X-axis using the touch display apparatus of FIG. 1.

Hereinafter, an exemplary embodiment of a method of determining a first touch T1 and a second touch T2 on the touch panel 100 is explained referring to FIG. 5A.

Referring to FIGS. 1, 4 and 5A, when the touch panel 100 is touched, the light emitted from the light emitting element 210 is not totally reflected but leaked by a touch providing means. Accordingly, an intensity of the light received at the light receiving elements 310 is decreased so that the touch determining part 600 converts the light received at the light receiving elements 310 into a signal, and determines the touch based on the signal.

The touch determining part 600 determines whether the touch panel 100 is touched or not based on a total sum of changes of signal intensities of the light receiving elements 310. The touch determining part 600 may determine a size of the touch providing means based on the total sum of the changes of the signal intensities of the light receiving elements 310.

The touch determining part 600 determines a touch coordinate of the X-axis based on a peak of the changes of the signal intensities of the light receiving elements 310.

In one or more exemplary embodiments, for example, when the first touch T1 occurs on the touch panel 100, signal intensities of light receiving elements 310 close to the first touch T1 may be relatively severely changed. However, signal intensities of light receiving elements 310 far away from the first touch T1 may not be severely changed. Thus, the touch determining part 600 may determine the touch coordinate of the X-axis of the first touch T1 as a peak portion X1 of the change of the signal intensity of the light receiving elements 310 in FIG. 5A.

In one or more exemplary embodiments, for example, when the second touch T2 occurs on the touch panel 100, signal intensities of light receiving elements 310 close to the second touch T2 may be relatively severely changed. However, signal intensities of light receiving elements 310 far away from the second touch T2 may not be severely changed. Thus, the touch determining part 600 may determine the touch coordinate of the X-axis of the second touch T2 as a peak portion of the change of the signal intensity of the light receiving elements 310 in FIG. 5A.

Figure 5B:
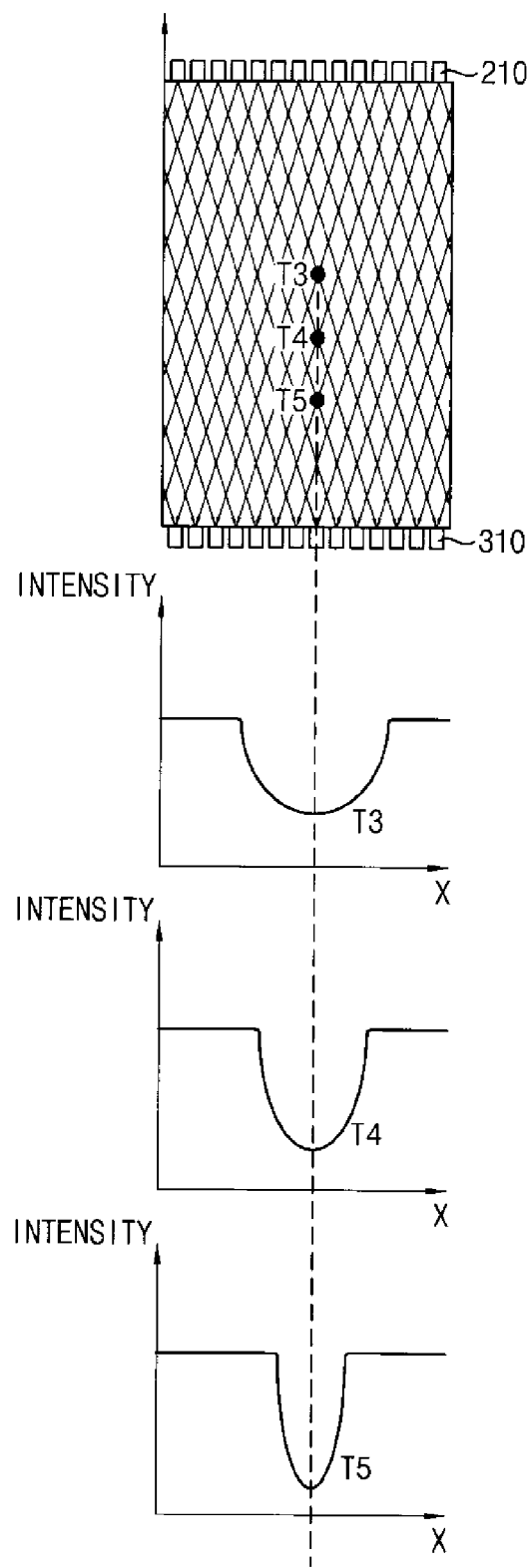
FIG. 5B is a conceptual diagram illustrating an exemplary embodiment of a method of determining a touch coordinate of a Y-axis using the touch display apparatus of FIG. 1.

FIG. 5B is a conceptual diagram illustrating an exemplary embodiment of a method of determining a touch coordinate of a Y-axis using the touch display apparatus of FIG. 1.

Hereinafter, an exemplary embodiment of a method of determining a third touch T3, a fourth touch T4 and a fifth touch T5 on the touch panel 100 is explained referring to FIG. 5B.

Referring to FIGS. 1, 4 and 5B, the touch determining part 600 determines a touch coordinate of the Y-axis based on the number of the light receiving elements 310 which sense the touch and changes of the signal intensities of the respective light receiving elements 310.

In one or more exemplary embodiments, for example, when the third touch T3 occurs on the touch panel 100, a relatively large number of the light receiving elements 310 senses the third touch T3 because the third touch T3 is relatively far away from the light receiving elements 310. In contrast, the changes of the signal intensities of the light receiving elements 310 due to the third touch T3 are relatively low.

When the fourth touch T4 occurs on the touch panel 100, a smaller number of the light receiving elements 310 senses the fourth touch T4 compared to the third touch T3 because the fourth touch T4 is closer than the third touch T3 to the light receiving elements 310. In contrast, the changes of the signal intensities of the light receiving elements 310 due to the fourth touch T4 are higher compared to the third touch T3.

When the fifth touch T5 occurs on the touch panel 100, an even smaller number of the light receiving elements 310 senses the fifth touch T5 compared to the fourth touch T4 because the fifth touch T5 is closer than the fourth touch T4 to the light receiving elements 310, and the number of the light receiving elements 310 sensing the fifth touch T5 may be relatively small compared to those sensing the third touch T3. In contrast, the changes of the signal intensities of the light receiving elements 310 due to the fifth touch T5 are relatively high compared to the fourth touch T4 and even higher than those of the light receiving elements due to the third touch T3.

As explained above, the touch determining part 600 may determine the touch coordinate of the Y-axis.

Figure 5C:
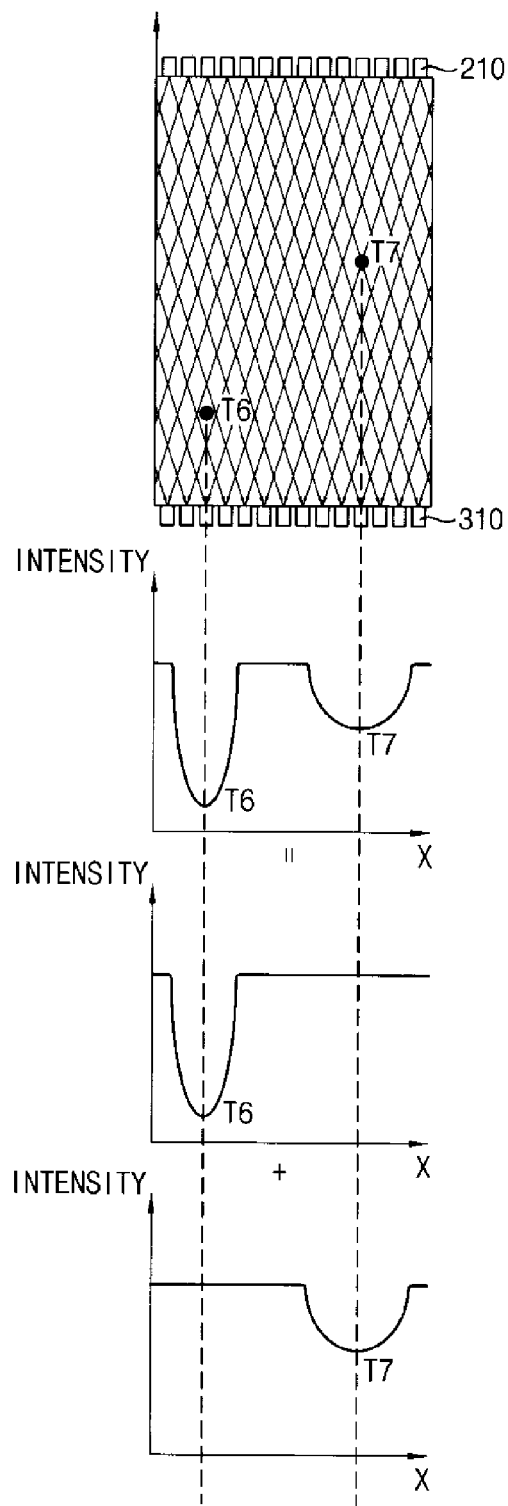
FIG. 5C is a conceptual diagram illustrating an exemplary embodiment of a method of determining multiple touches using the touch display apparatus of FIG. 1.

FIG. 5C is a conceptual diagram illustrating an exemplary embodiment of a method of determining multiple touches using the touch display apparatus of FIG. 1.

Hereinafter, an exemplary embodiment of a method of determining multiple touches including a sixth touch T6 and a seventh touch T7 on the touch panel 100 is explained referring to FIG. 5C.

Referring to FIGS. 1, 4 and 5C, the touch determining part 600 may determine the multiple touches by dividing changes of the signal intensities of the light receiving elements 310 into a plurality of curves representing changes of the signal intensities corresponding to respective touches.

When the sixth touch T6 and the seventh touch T7 occur on the touch panel 100 simultaneously, the touch determining part 600 divides the changes of the signal intensities of the light receiving elements 310 into a curve representing changes of the signal intensities by the sixth touch T6 and a curve representing changes of the signal intensities by the seventh touch T7.

The touch determining part 600 may determine the touch coordinates of the X-axis and of the Y-axis of the sixth touch T6 using the methods of FIGS. 5A and 5B. The touch determining part 600 may determine the touch coordinates of the X-axis and of the Y-axis of the seventh touch T7 using the methods of FIGS. 5A and 5B.

According to one or more exemplary embodiment, the first substrate and the second substrate respectively sense the change of the light so that the touch display apparatus may recognize touches on both sides of the touch panel. The touch display apparatus includes the light transmitting element connecting the first substrate to the second substrate so that the number of the light emitting elements and the number of the light receiving elements may be decreased.

Figure 6:
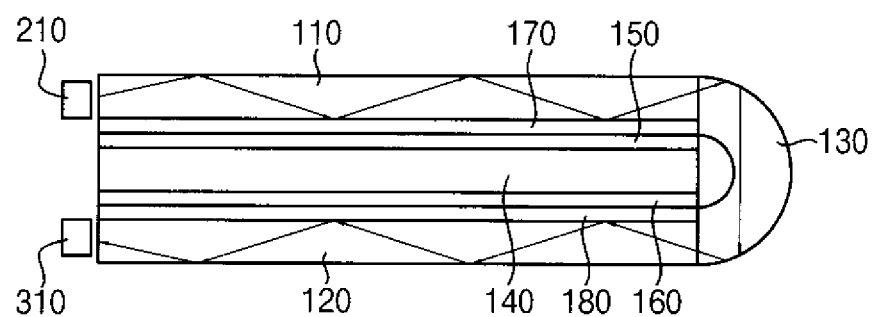
FIG. 6 is a cross-sectional view illustrating another exemplary embodiment of a touch panel, a light emitting part and a light receiving part of a touch display apparatus according to the invention.

FIG. 6 is a cross-sectional view illustrating another exemplary embodiment of a touch panel, a light emitting part and a light receiving part of a touch display apparatus according to the invention.

An exemplary embodiment of the touch display apparatus in FIG. 6 is substantially the same as the previous exemplary embodiment of the touch display apparatus explained referring to FIGS. 1 to 3, except for positions of the first polarizing plate and the second polarizing plate. Thus, the same reference numerals will be used to refer to the same or like parts as those described in the previous exemplary embodiment of FIGS. 1 to 3 and any repetitive explanation concerning the above elements will be omitted.

Referring to FIGS. 1 and 6, the touch display apparatus includes a touch panel 100, a light emitting part 200, a light receiving part 300, a panel driver 400, a light emitting element driver 500 and a touch determining part 600.

The touch panel 100 displays an image. A touch occurs on the touch panel 100. The light emitting part 200 provides light to the touch panel 100. The light receiving part 300 receives light from the touch panel 100. The panel driver 400 drives the touch panel 100. The light emitting element driver 500 drives a plurality of light emitting elements of the light emitting part 200. The touch determining part 600 determines a touch position based on a signal received at a plurality of light receiving elements of the light receiving part 300.

The touch panel 100 includes a first substrate 110, a second substrate 120, a light transmitting element 130 and a light converting element 140.

The touch panel 100 may further include a first polarizing plate 150 and a second polarizing plate 160.

The first polarizing plate 150 is disposed on a lower surface of the first substrate 110. The first polarizing plate 150 may make contact with the first substrate 110. The first polarizing plate 150 transmits light oscillating in a specific direction and absorbs light oscillating in the other directions. The first polarizing plate 150 has a first polarizing axis.

The first polarizing plate 150 may include a metal pattern. A light transmitting efficiency of the first substrate 110 may be increased by the first polarizing plate 150.

The first auxiliary layer 170 may be disposed between the first substrate 110 and the first polarizing plate 150. Alternatively, the first auxiliary layer 170 may be omitted such that the first polarizing plate 150 makes contact with the first substrate 110.

The second polarizing plate 160 is disposed on an upper surface of the second substrate 120. The second polarizing plate 160 may make contact with the second substrate 120. The second polarizing plate 160 transmits light oscillating in a specific direction and absorbs light oscillating in the other directions. The second polarizing plate 160 has a second polarizing axis. The second polarizing axis may be substantially perpendicular to the first polarizing axis.

The second polarizing plate 160 may include a metal pattern. A light transmitting efficiency of the second substrate 120 may be increased by the second polarizing plate 160.

The second auxiliary layer 180 may be disposed between the second substrate 120 and the second polarizing plate 160. Alternatively, the second auxiliary layer 180 may be omitted such that the second polarizing plate 160 makes contact with the second substrate 120.

According to one or more exemplary embodiment, the first substrate and the second substrate respectively sense the change of the light so that the touch display apparatus may recognize touches on both sides of the touch panel. The touch display apparatus includes the light transmitting element connecting the first substrate to the second substrate so that the number of the light emitting elements and the number of the light receiving elements may be decreased.

Figure 7:
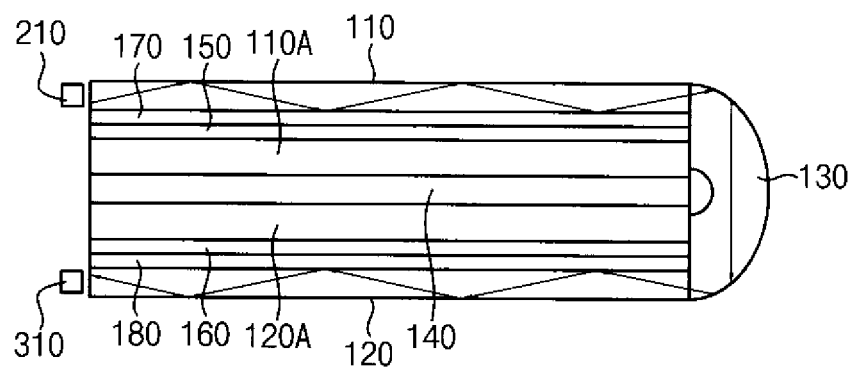
FIG. 7 is a cross-sectional view illustrating still another exemplary embodiment of a touch panel, a light emitting part and a light receiving part of a touch display apparatus according to the invention.

FIG. 7 is a cross-sectional view illustrating still another exemplary embodiment of a touch panel, a light emitting part and a light receiving part of a touch display apparatus according to the invention.

An exemplary embodiment of the touch display apparatus in FIG. 7 is substantially the same as previous exemplary embodiment of the touch display apparatus explained referring to FIGS. 1 to 3, except that the touch panel further includes a third substrate and a fourth substrate. Thus, the same reference numerals will be used to refer to the same or like parts as those described in the previous exemplary embodiment of FIGS. 1 to 3 and any repetitive explanation concerning the above elements will be omitted.

Referring to FIGS. 1 and 7, the touch display apparatus includes a touch panel 100, a light emitting part 200, a light receiving part 300, a panel driver 400, a light emitting element driver 500 and a touch determining part 600.

The touch panel 100 displays an image. A touch occurs on the touch panel 100. The light emitting part 200 provides light to the touch panel 100. The light receiving part 300 receives light from the touch panel 100. The panel driver 400 drives the touch panel 100. The light emitting element driver 500 drives a plurality of light emitting elements of the light emitting part 200. The touch determining part 600 determines a touch position based on a signal received at a plurality of light receiving elements of the light receiving part 300.

The touch panel 100 includes a first substrate 110, a second substrate 120, a third substrate 110A, a fourth substrate 120A, a light transmitting element 130 and a light converting element 140.

The light emitting part 200 is disposed along a first side of the first substrate 110. The first substrate 110 guides the light generated and emitted from the light emitting part 200 to the light transmitting element 130. The first substrate 110 guides the light emitted from the light emitting part 200 to the light transmitting element 130 by a total reflection.

The second substrate 120 faces the first substrate 110. The light receiving part 300 is disposed along a first side of the second substrate 120 corresponding to the first side of the first substrate 110. The second substrate 120 guides the light from the light transmitting element 130 to the light receiving part 300. The second substrate 120 guides the light from the light transmitting element 130 to the light receiving part 300 by a total reflection.

The third substrate 110A is disposed under the first substrate 110, and between the first substrate 110 and the light converting element 140. The third substrate 110A may include a color filter and a common electrode.

The fourth substrate 120A is disposed between the second substrate 120 and the third substrate 110A, and between the second substrate 120 and the light converting element 140. The fourth substrate 120A may include a pixel layer having a plurality of switching elements disposed in a matrix form and a pixel electrode facing the common electrode. A plurality of gate lines having longitudinal axes extending in the first direction D1, and a plurality of data lines having longitudinal axes extending in a second direction D2 crossing the first direction D1, may be disposed on the fourth substrate 120A.

The first polarizing plate 150 may be disposed between the first substrate 110 and the third substrate 110A. The second polarizing plate 160 may be disposed between the second substrate 120 and the fourth substrate 120A.

According to one or more exemplary embodiment, the first substrate and the second substrate respectively sense the change of the light so that the touch display apparatus may recognize touches on both sides of the touch panel. The touch display apparatus includes the light transmitting element connecting the first substrate to the second substrate so that the number of the light emitting elements and the number of the light receiving elements may be decreased.

Figure 8:
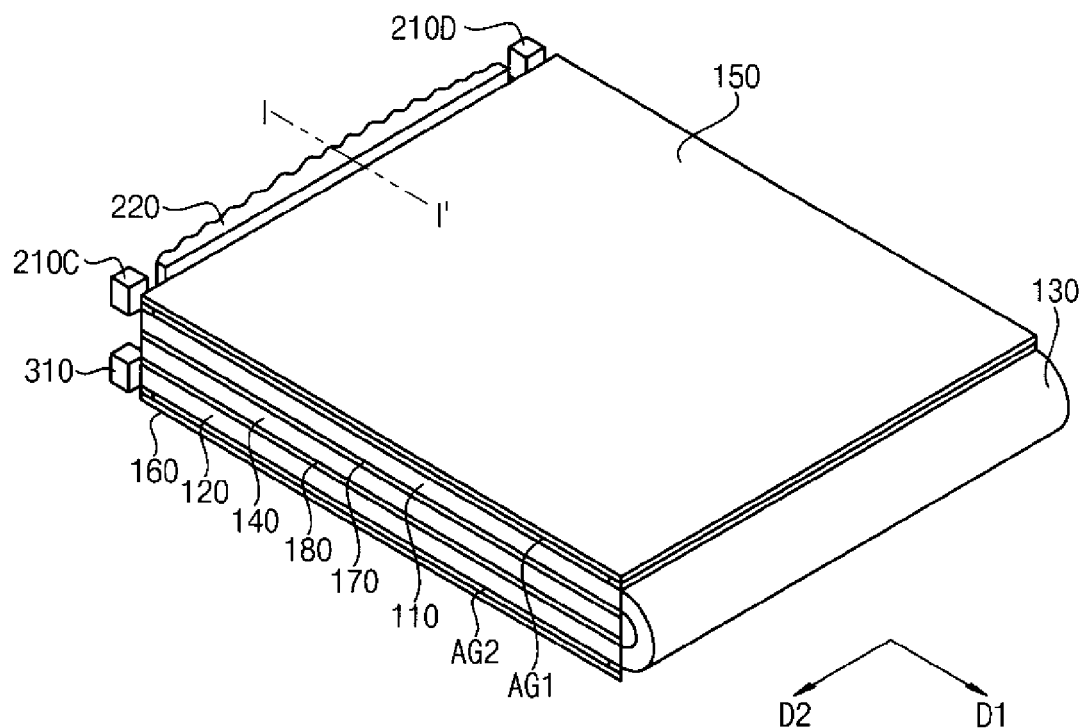
FIG. 8 is a perspective view illustrating still another exemplary embodiment of a touch panel, a light emitting part and a light receiving part of a touch display apparatus according to the invention.
Figure 9:
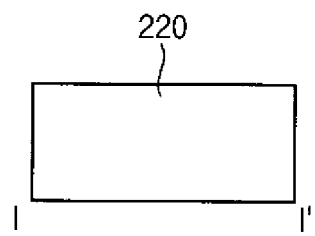
FIG. 9 is a cross-sectional view illustrating an exemplary embodiment a light guiding element of the touch display apparatus of FIG. 8 along line IT.

FIG. 8 is a perspective view illustrating still another an exemplary embodiment of a touch panel, a light emitting part and a light receiving part of a touch display apparatus according to the invention. FIG. 9 is a cross-sectional view illustrating an exemplary embodiment of a light guiding element of FIG. 8 along line I-I'.

An exemplary embodiment of the touch display apparatus in FIG. 8 is substantially the same as the previous exemplary embodiment of the touch display apparatus explained referring to FIGS. 1 to 3, except for a structure of the light emitting part. Thus, the same reference numerals will be used to refer to the same or like parts as those described in the previous exemplary embodiment of FIGS. 1 to 3 and any repetitive explanation concerning the above elements will be omitted.

Referring to FIGS. 1, 8 and 9, the touch display apparatus includes a touch panel 100, a light emitting part 200, a light receiving part 300, a panel driver 400, a light emitting element driver 500 and a touch determining part 600.

The touch panel 100 displays an image. A touch occurs on the touch panel 100. The light emitting part 200 provides light to the touch panel 100. The light receiving part 300 receives light from the touch panel 100. The panel driver 400 drives the touch panel 100. The light emitting element driver 500 drives a plurality of light emitting elements of the light emitting part 200. The touch determining part 600 determines a touch position based on a signal received at a plurality of light receiving elements of the light receiving part 300.

The light emitting part 200 includes a plurality of the light emitting elements 210. The light emitting part 200 includes a first light emitting element 210C, a second light emitting element 210D and a light guiding element 220.

The first light emitting element 210C is disposed at a first end portion of a first side of a first substrate 110. The second light emitting element 210D is disposed at a second end portion of the first side of the first substrate 110 opposite to the first end portion.

The light guiding element 220 is disposed between the first light emitting element 210C and the second light emitting element 210D. The light guiding element 220 guides the light from the first and second light emitting elements 210C and 210D toward the first substrate 110. The light guiding element 220 may guide the light toward the first substrate 110 in a direction substantially perpendicular to a side surface of the first substrate 110 facing the light guiding element 220. The light guiding element 220 may guide the light in the first direction D1.

The light guiding element 220 includes a first side wall adjacent to the first substrate 110 and a second side wall opposite to the first side wall. The light guiding element 220 may include a light guiding pattern on the second side wall. The light guiding pattern may include a convex-concave pattern. The first side wall of the light guiding element 220 may be substantially parallel to the side surface of the first substrate 110. Thus, the light guiding element 220 may have a cross section of a rectangle.

According to one or more exemplary embodiment, the first substrate and the second substrate respectively sense the change of the light so that the touch display apparatus may recognize touches on both sides of the touch panel. The touch display apparatus includes the light transmitting element connecting the first substrate to the second substrate so that the number of the light emitting elements and the number of the light receiving elements may be decreased.

In addition, the light emitting part includes a light guiding element so that the number of the light emitting elements may be further decreased.

Figure 10:
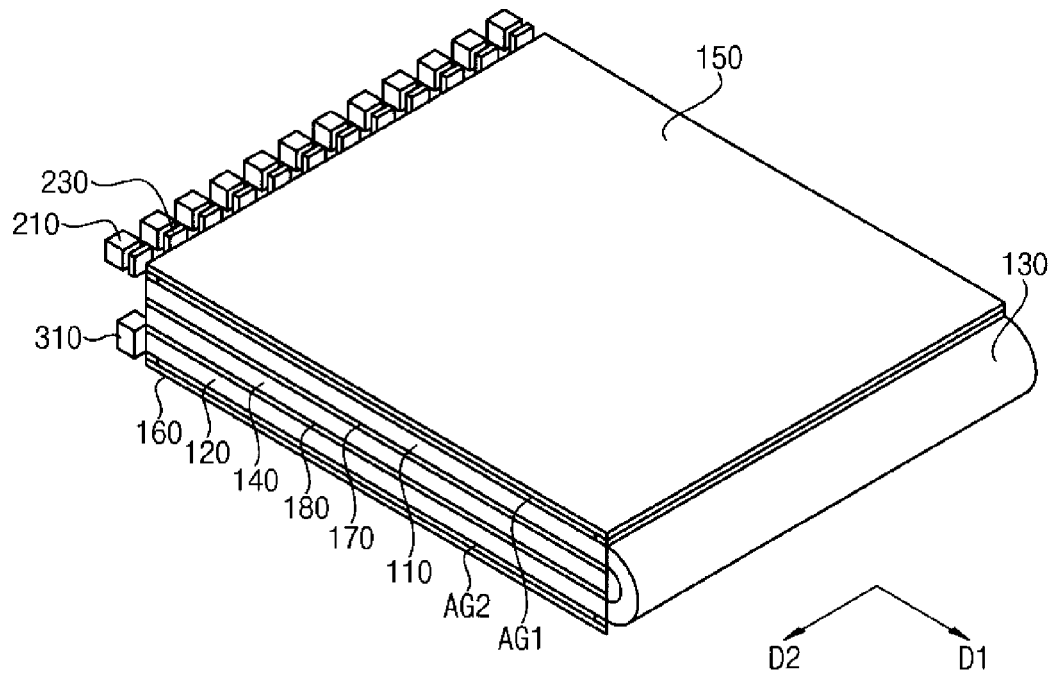
FIG. 10 is a perspective view illustrating still another exemplary embodiment of a touch panel, a light emitting part and a light receiving part of a touch display apparatus according to the invention.

FIG. 10 is a perspective view illustrating still another exemplary embodiment of a touch panel, a light emitting part and a light receiving part of a touch display apparatus according to the invention.

An exemplary embodiment of the touch display apparatus in FIG. 10 is substantially the same as the previous exemplary embodiment of the touch display apparatus explained referring to FIGS. 1 to 3 except for a structure of the light emitting part. Thus, the same reference numerals will be used to refer to the same or like parts as those described in the previous exemplary embodiment of FIGS. 1 to 3 and any repetitive explanation concerning the above elements will be omitted.

Referring to FIGS. 1 and 10, the touch display apparatus includes a touch panel 100, a light emitting part 200, a light receiving part 300, a panel driver 400, a light emitting element driver 500 and a touch determining part 600.

The touch panel 100 displays an image. A touch occurs on the touch panel 100. The light emitting part 200 provides light to the touch panel 100. The light receiving part 300 receives light from the touch panel 100. The panel driver 400 drives the touch panel 100. The light emitting element driver 500 drives a plurality of light emitting elements of the light emitting part 200. The touch determining part 600 determines a touch position based on a signal received at a plurality of light receiving elements of the light receiving part 300.

The light emitting part 200 includes a plurality of the light emitting elements 210 and a plurality of lenses 230. The light emitting elements 210 are disposed along a first side of a first substrate 110 in the second direction D2. The lenses 230 are disposed between the light emitting elements 210 and the first substrate 110.

The number of the lenses 230 may be substantially equal to the number of the light emitting elements 210. The lenses 230 may be in one-to-one correspondence with the light emitting elements 210. The lenses 230 may be convex lenses.

The lenses 230 condense the light emitted from the light emitting elements 210 to provide the light to the first substrate 110. An efficiency of the light emitting part 200 may be improved by the lenses 230.

According to one or more exemplary embodiment, the first substrate and the second substrate respectively sense the change of the light so that the touch display apparatus may recognize touches on both sides of the touch panel. The touch display apparatus includes the light transmitting element connecting the first substrate to the second substrate so that the number of the light emitting elements and the number of the light receiving elements may be decreased.

Figure 11:
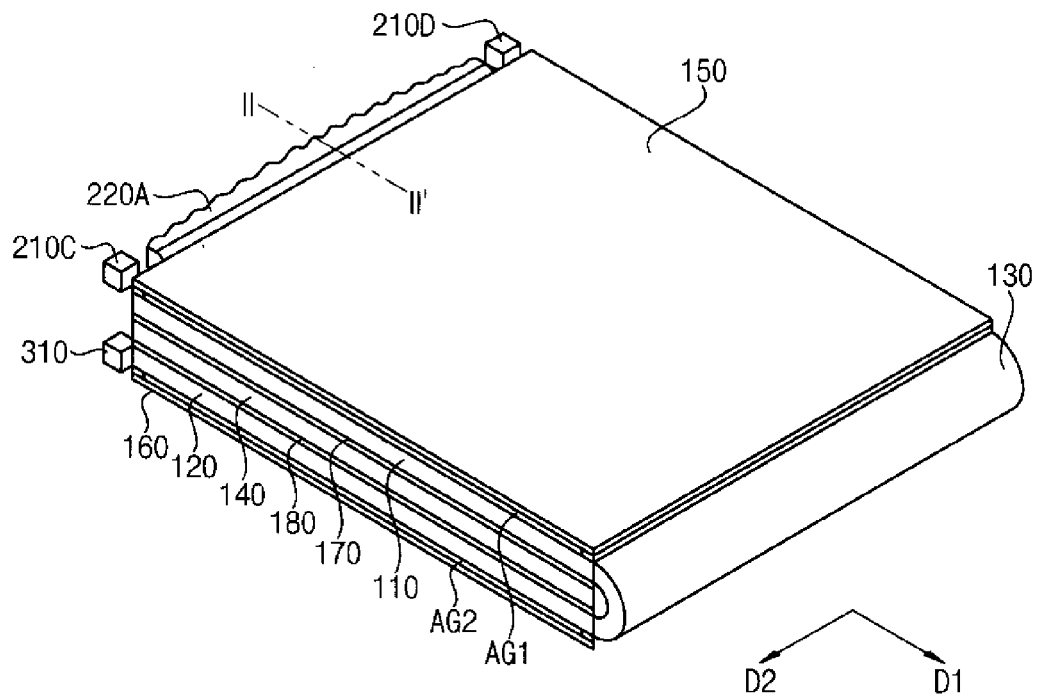
FIG. 11 is a perspective view illustrating still another exemplary embodiment of a touch panel, a light emitting part and a light receiving part of a touch display apparatus according to the invention.
Figure 12:
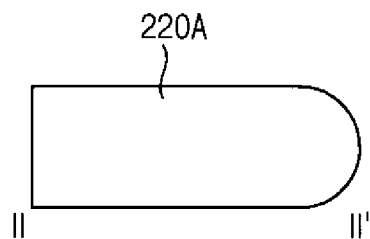
FIG. 12 is a cross-sectional view illustrating an exemplary embodiment of a light guiding element of the touch display apparatus of FIG. 11 along a line II-II'.

FIG. 11 is a perspective view illustrating still another exemplary embodiment of a touch panel, a light emitting part and a light receiving part of a touch display apparatus according to the invention. FIG. 12 is a cross-sectional view illustrating an exemplary embodiment of a light guiding element of FIG. 11 along line II-II'.

An exemplary embodiment of the touch display in FIG. 11 is substantially the same as the previous exemplary embodiment of the touch display apparatus explained referring to FIGS. 1 to 3 except for a structure of the light emitting part. Thus, the same reference numerals will be used to refer to the same or like parts as those described in the previous exemplary embodiment of FIGS. 1 to 3 and any repetitive explanation concerning the above elements will be omitted.

Referring to FIGS. 1, 11 and 12, the touch display apparatus includes a touch panel 100, a light emitting part 200, a light receiving part 300, a panel driver 400, a light emitting element driver 500 and a touch determining part 600.

The touch panel 100 displays an image. A touch occurs on the touch panel 100. The light emitting part 200 provides light to the touch panel 100. The light receiving part 300 receives light from the touch panel 100. The panel driver 400 drives the touch panel 100. The light emitting element driver 500 drives a plurality of light emitting elements of the light emitting part 200. The touch determining part 600 determines a touch position based on a signal received at a plurality of light receiving elements of the light receiving part 300.

The light emitting part 200 includes a plurality of the light emitting elements 210. The light emitting part 200 includes a first light emitting element 210C, a second light emitting element 210D and a light guiding element 220A.

The first light emitting element 210C is disposed at a first end portion of a first side of a first substrate 110. The second light emitting element 210D is disposed at a second end portion of the first side of the first substrate 110 opposite to the first end portion.

The light guiding element 220A is disposed between the first light emitting element 210C and the second light emitting element 210D. The light guiding element 220A guides the light from the first and second light emitting elements 210C and 210D toward the first substrate 110. The light guiding element 220A may guide the light toward the first substrate 110 in a direction substantially perpendicular to a side surface of the first substrate 110 facing the light guiding element 220A. The light guiding element 220A may guide the light in the first direction D1.

The light guiding element 220A includes a first side wall adjacent to the first substrate 110 and a second side wall opposite to the first side wall. The light guiding element 220A may include a light guiding pattern on the second side wall. The light guiding pattern may include a convex-concave pattern. The first side wall of the light guiding element 220A may have a convex surface toward the first substrate 110. Thus, an efficiency of the light emitting part 200 may be improved by the convex surface of the light guiding element 220A.

According to one or more exemplary embodiment, the first substrate and the second substrate respectively sense the change of the light so that the touch display apparatus may recognize touches on both sides of the touch panel. The touch display apparatus includes the light transmitting element connecting the first substrate to the second substrate so that the number of the light emitting elements and the number of the light receiving elements may be decreased.

In addition, the light emitting part includes a light guiding element so that the number of the light emitting elements may be further decreased.

Figure 13:
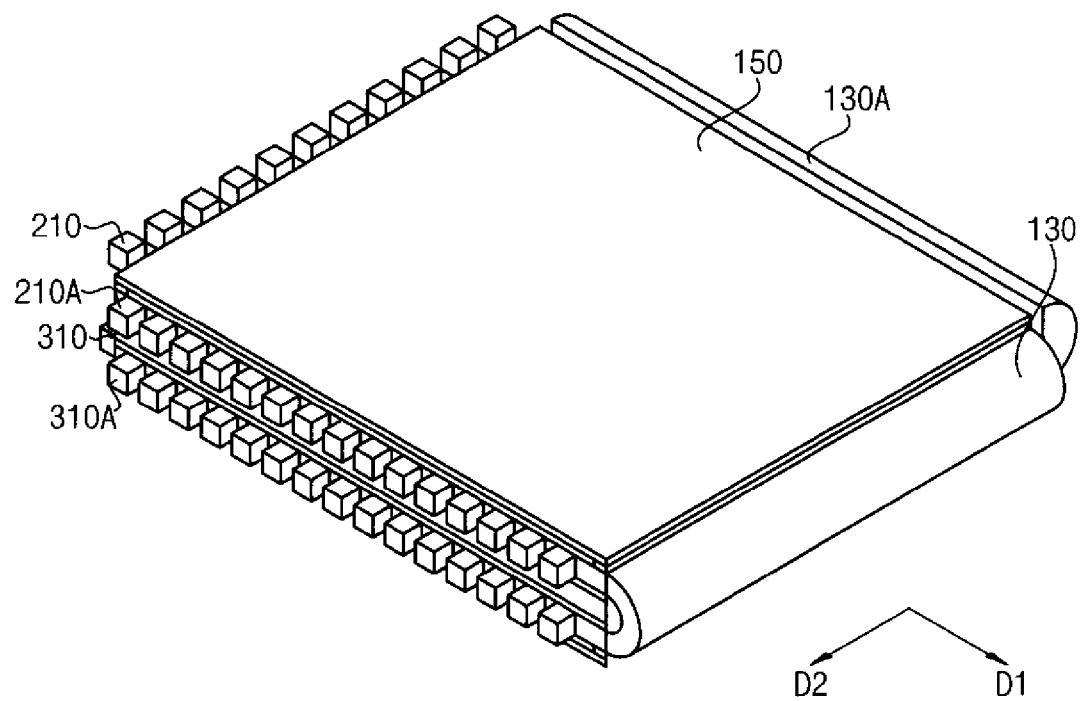
FIG. 13 is a perspective view illustrating still another exemplary embodiment of a touch panel, a light emitting part and a light receiving part of a touch display apparatus according to the invention.

FIG. 13 is a perspective view illustrating still another exemplary embodiment of a touch panel, a light emitting part and a light receiving part of a touch display apparatus according to the invention.

An exemplary embodiment of the touch display apparatus in FIG. 13 is substantially the same as the previous exemplary embodiment of the touch display apparatus explained referring to FIGS. 1 to 3 except that the touch display apparatus further includes a second light emitting part, a second light receiving part and a second light transmitting element. Thus, the same reference numerals will be used to refer to the same or like parts as those described in the previous exemplary embodiment of FIGS. 1 to 3 and any repetitive explanation concerning the above elements will be omitted.

Referring to FIGS. 1 and 13, the touch display apparatus includes a touch panel 100, a first light emitting part 200, a second light emitting part, a first light receiving part 300, a second light receiving part, a panel driver 400, a light emitting element driver 500 and a touch determining part 600.

The touch panel 100 displays an image. A touch occurs on the touch panel 100. The first and second light emitting parts provide light to the touch panel 100. The first and second light receiving parts receive light from the touch panel 100. The panel driver 400 drives the touch panel 100. The light emitting element driver 500 drives a plurality of light emitting elements of the first and second light emitting parts. The touch determining part 600 determines a touch position based on a signal received at a plurality of light receiving elements of the first and second light receiving parts.

The touch panel 100 includes a first substrate 110, a second substrate 120, a first light transmitting element 130, a second light transmitting element 130A and a light converting element 140.

The first light emitting part 200 is disposed along a first side of the first substrate 110 in the second direction D2. The first light emitting part 200 includes a plurality of first light emitting elements 210 disposed along the first side of the first substrate 110.

The first substrate 110 guides the light generated and emitted from the first light emitting part 200 to the first light transmitting element 130. The first substrate 110 guides the light emitted from the first light emitting part 200 to the first light transmitting element 130 by a total reflection.

The second light emitting part is disposed along a third side of the first substrate 110 adjacent to the first side of the first substrate 110. The second light emitting part includes a plurality of second light emitting elements 210A disposed along the third side of the first substrate 110 in the first direction D1.

The first substrate 110 guides the light generated and emitted from the second light emitting part to the second light transmitting element 130A. The first substrate 110 guides the light emitted from the second light emitting part to the second light transmitting element 130A by a total reflection.

The first light transmitting element 130 connects a second side of the first substrate 110 opposing the first side of the first substrate 110 to a second side of the second substrate 120 opposing the first side of the second substrate 120. The first light transmitting element 130 may transmit the light from the second side of the first substrate 110 to the second side of the second substrate 120.

The second light transmitting element 130A connects a fourth side of the first substrate 110 opposing the third side of the first substrate 110 to a fourth side of the second substrate 120 opposing the third side of the second substrate 120. The second light transmitting element 130A may transmit the light from the fourth side of the first substrate 110 to the fourth side of the second substrate 120.

The first light receiving part 300 is disposed along a first side of the second substrate 120 corresponding to the first side of the first substrate 110. The first light receiving part 300 includes a plurality of first light receiving elements 310 disposed along the first side of the second substrate 120 in the second direction D2.

The second light receiving part is disposed along a third side of the second substrate 120 adjacent to the third side of the first substrate 110. The second light receiving part includes a plurality of second light emitting elements 310A disposed along the third side of the second substrate 120 in the first direction D1.

According to one or more exemplary embodiment, the first substrate and the second substrate respectively sense the change of the light so that the touch display apparatus may recognize touches on both sides of the touch panel. The touch display apparatus includes the first and second light transmitting elements connecting the first substrate to the second substrate so that the number of the light emitting elements and the number of the light receiving elements may be decreased.

Figure 14:
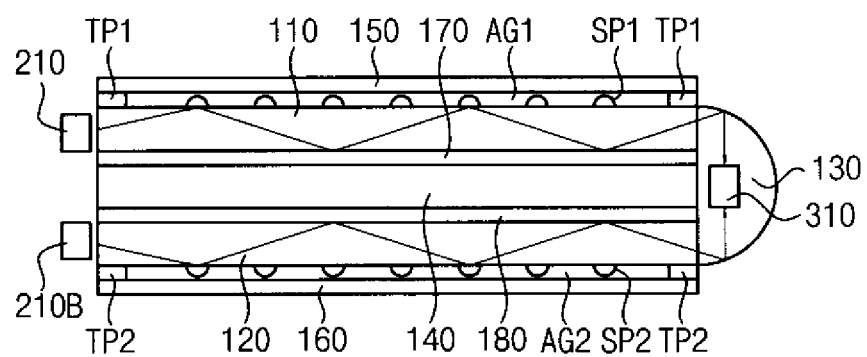
FIG. 14 is a cross-sectional view illustrating still another exemplary embodiment of a touch panel, a light emitting part and a light receiving part of a touch display apparatus according to the invention.

FIG. 14 is a cross-sectional view illustrating still another exemplary embodiment of a touch panel, a light emitting part and a light receiving part of a touch display apparatus according to the invention.

An exemplary embodiment of the touch display apparatus in FIG. 14 is substantially the same as the previous exemplary embodiment of the touch display apparatus explained referring to FIGS. 1 to 3 except for the number of the light emitting part, the number of the light receiving part and positions of the light emitting part and the light receiving part. Thus, the same reference numerals will be used to refer to the same or like parts as those described in the previous exemplary embodiment of FIGS. 1 to 3 and any repetitive explanation concerning the above elements will be omitted.

Referring to FIGS. 1 and 14, the touch display apparatus includes a touch panel 100, a first light emitting part 200, a third light emitting part, a light receiving part 300, a panel driver 400, a light emitting element driver 500 and a touch determining part 600.

The touch panel 100 displays an image. A touch occurs on the touch panel 100. The first and third light emitting parts provide light to the touch panel 100. The light receiving part 300 receives light from the touch panel 100. The panel driver 400 drives the touch panel 100. The light emitting element driver 500 drives a plurality of light emitting elements of the first and third light emitting parts. The touch determining part 600 determines a touch position based on a signal received at a plurality of light receiving elements of the light receiving part 300.

The first light emitting part 200 is disposed along a first side of the first substrate 110. The first light emitting part 200 includes a plurality of first light emitting elements 210 disposed along the first side of the first substrate 110.

The third light emitting part is disposed along a first side of the second substrate 120 corresponding to the first side of the first substrate 110. The third light emitting part includes a plurality of third light emitting elements 210B disposed along the first side of the second substrate 120.

The light receiving part 300 is disposed adjacent to a second side of the first substrate 110 opposing the first side of the first substrate 110 and adjacent to a second side of the second substrate 120 opposing the first side of the second substrate 120. The light receiving part 300 includes a plurality of light receiving elements 310.

A light transmitting element 130 connects the second side of the first substrate 110 to the second side of the second substrate 120. The light receiving part 300 may be disposed in the light transmitting element 130.

According to one or more exemplary embodiment, the first substrate and the second substrate respectively sense the change of the light so that the touch display apparatus may recognize touches on both sides of the touch panel. The touch display apparatus includes the light transmitting element connecting the first substrate to the second substrate so that the number of the light emitting elements and the number of the light receiving elements may be decreased.

Figure 15:
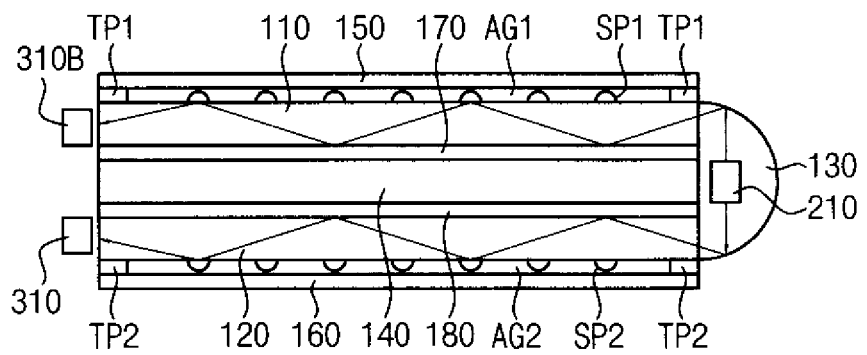
FIG. 15 is a cross-sectional view illustrating still another exemplary embodiment of a touch panel, a light emitting part and a light receiving part of a touch display apparatus according to the invention.

FIG. 15 is a cross-sectional view illustrating still another exemplary embodiment of a touch panel, a light emitting part and a light receiving part of a touch display apparatus according to the invention.

An exemplary embodiment of the touch display apparatus in FIG. 15 is substantially the same as the previous exemplary embodiment of the touch display apparatus explained referring to FIGS. 1 to 3 except for the number of the light emitting part, the number of the light receiving part and positions of the light emitting part and the light receiving part. Thus, the same reference numerals will be used to refer to the same or like parts as those described in the previous exemplary embodiment of FIGS. 1 to 3 and any repetitive explanation concerning the above elements will be omitted.

Referring to FIGS. 1 and 15, the touch display apparatus includes a touch panel 100, a light emitting part 200, a first light receiving part 300, a third light receiving part, a panel driver 400, a light emitting element driver 500 and a touch determining part 600.

The touch panel 100 displays an image. A touch occurs on the touch panel 100. The light emitting part 200 provides light to the touch panel 100. The first and third light receiving parts receive light from the touch panel 100. The panel driver 400 drives the touch panel 100. The light emitting element driver 500 drives a plurality of light emitting elements of the light emitting part 200. The touch determining part 600 determines a touch position based on a signal received at a plurality of light receiving elements of the first and third light receiving parts.

The third light receiving part is disposed along a first side of the first substrate 110. The third light receiving part includes a plurality of third light receiving elements 310B disposed along the first side of the first substrate 110.

The first light receiving part is disposed along a first side of the second substrate 120 corresponding to the first side of the first substrate 110. The first light receiving part includes a plurality of first light receiving elements 310 disposed along the first side of the second substrate 120.

The light emitting part 200 is disposed adjacent to a second side of the first substrate 110 opposing the first side of the first substrate 110 and adjacent to a second side of the second substrate 120 opposing the first side of the second substrate 120. The light emitting part 200 includes a plurality of light emitting elements 210.

A light transmitting element 130 connects the second side of the first substrate 110 to the second side of the second substrate 120. The light emitting part 200 may be disposed in the light transmitting element 130.

According to one or more exemplary embodiment, the first substrate and the second substrate respectively sense the change of the light so that the touch display apparatus may recognize touches on both sides of the touch panel. The touch display apparatus includes the light transmitting element connecting the first substrate to the second substrate so that the number of the light emitting elements and the number of the light receiving elements may be decreased.

According to one or more exemplary embodiments of the invention as explained above, the touch display apparatus may recognize touches on both of opposing surfaces of the touch panel and a manufacturing cost of the touch display apparatus may be decreased.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A touch display apparatus comprising:
    a first substrate including an upper surface on which a touch occurs;
    a second substrate which faces and overlaps the first substrate in a same direction in which the touch occurs on the upper surface of the first substrate;
    a first light emitting part adjacent to a first side of the first substrate, wherein the first light emitting part generates and emits light to the first substrate;
    a first light receiving part adjacent to a first side of the second substrate at a same side of the touch display apparatus as the first side of the first substrate, wherein the first light receiving part receives light from the second substrate; and
    a first light transmitting element which connects a second side of the first substrate which opposes the first side of the first substrate, to a second side of the second substrate which opposes the first side of the second substrate.

2. The touch display apparatus of claim 1, wherein the first light emitting part comprises a plurality of light emitting elements adjacent to the first side of the first substrate.

3. The touch display apparatus of claim 2, wherein the first light emitting part further comprises a plurality of lenses between the light emitting elements and the first substrate.

4. The touch display apparatus of claim 1, wherein the first light emitting part comprises:
    a first light emitting element at a first end portion of the first side of the first substrate;
    a second light emitting element at a second end portion of the first side of the first substrate opposite to the first end portion of the first side of the first substrate; and
    a first light guiding element between the first light emitting element and the second light emitting element, wherein the first light guiding element guides light emitted from the first and second light emitting elements toward the first substrate.

5. The touch display apparatus of claim 4, wherein the first light guiding element comprises:
    a first side wall adjacent to the first substrate,
    a second side wall opposite to the first side wall, and
    a light guiding pattern on the second side wall.

6. The touch display apparatus of claim 5, wherein the first side wall has a convex surface which extends toward the first substrate.

7. The touch display apparatus of claim 1, wherein the first light receiving part comprises a plurality of optical sensors adjacent to the first side of the second substrate.

8. The touch display apparatus of claim 1, wherein the first light transmitting element connects the second side surfaces of the first substrate and the second substrate to each other by being bonded to the first substrate and the second substrate using an optical bonding method.

9. The touch display apparatus of claim 1, wherein the first light transmitting element, the first substrate and the second substrate collectively form a single unitary indivisible member.

10. The touch display apparatus of claim 1, wherein the first light transmitting element has a cross section of a half circle.

11. The touch display apparatus of claim 1, wherein the first light transmitting element has a refractive index which is the same as refractive indices of the first and second substrates.

12. The touch display apparatus of claim 1, further comprising a touch determining part which is connected to the first light receiving part and determines a touch position.

13. The touch display apparatus of claim 12, wherein
    the first light receiving part comprises a plurality of light receiving elements adjacent to the first side of the second substrate; and
    the touch determining part determines whether the touch occurs or not based on a total sum of changes of signal intensities of the light receiving elements.

14. The touch display apparatus of claim 13, wherein the touch determining part determines a touch coordinate of the touch position along an X-axis based on a peak of the changes of the signal intensities of the light receiving elements.

15. The touch display apparatus of claim 13, wherein the touch determining part determines a touch coordinate of the touch position along a Y-axis based on the number of the light receiving elements which sense the touch and the changes of the signal intensities of the respective light receiving elements.

16. The touch display apparatus of claim 1,
further comprising a first auxiliary layer on a lower surface of the first substrate, and a second auxiliary layer on an upper surface of the second substrate.

17. The touch display apparatus of claim 1,
further comprising a first polarizing plate on an upper surface of the first substrate, and a second polarizing plate on a lower surface of the second substrate.

18. The touch display apparatus of claim 17, further comprising:
a first gap between the first substrate and the first polarizing plate, and
a second gap between the second substrate and the second polarizing plate.

19. The touch display apparatus of claim 1,
further comprising a first polarizing plate on a lower surface of the first substrate, and a second polarizing plate on an upper surface of the second substrate.

20. The touch display apparatus of claim 1,
further comprising:
a third substrate between the first substrate and the second substrate, the third substrate including a common electrode, and
a fourth substrate between the second substrate and the third substrate, the fourth substrate including a pixel electrode.

21. The touch display apparatus of claim 1, further comprising:
a second light emitting part adjacent to a third side of the first substrate adjacent to the first side of the first substrate, wherein the second light emitting part generates and emits light to the first substrate;
a second light receiving part adjacent to a third side of the second substrate at a same side of the touch display apparatus as the third side of the first substrate, wherein the second light receiving part receives light from the second substrate; and
a second light transmitting element which connects a fourth side of the first substrate opposing the third side of the first substrate to a fourth side of the second substrate opposing the third side of the second substrate.

22. A touch display apparatus comprising:
a first substrate including an upper surface on which a touch occurs;
a second substrate which faces and overlaps the first substrate in a same direction in which the touch occurs on the upper surface of the first substrate;
a first light emitting part adjacent to a first side of the first substrate, wherein the first light emitting part generates and emits light to the first substrate;
a second light emitting part adjacent to a first side of the second substrate at a same side of the touch display apparatus as the first side of the first substrate, wherein the second light emitting part generates and emits light to the second substrate;
a light receiving part adjacent to a second side of the first substrate opposing the first side of the first substrate and adjacent to a second side of the second substrate opposing the first side of the second substrate, wherein the light receiving part receives light from the first and second substrates; and
a light transmitting element which connects the second side of the first substrate to the second side of the second substrate.

23. A touch display apparatus comprising:
a first substrate including an upper surface on which a touch occurs;
a second substrate which faces and overlaps the first substrate in a same direction in which the touch occurs on the upper surface of the first substrate;
a first light receiving part adjacent to a first side of the first substrate, wherein the first light receiving part receives light from the first substrate;
a second light receiving part adjacent to a first side of the second substrate at a same side of the touch display apparatus as the first side of the first substrate, wherein the second light receiving part receives light from the second substrate;
a light emitting part adjacent to a second side of the first substrate opposing the first side of the first substrate and adjacent to a second side of the second substrate opposing the first side of the second substrate, wherein and the light emitting part generates and emits light to the first and second substrates; and
a light transmitting element which connects the second side of the first substrate to the second side of the second substrate.

24. A method of determining a touch position, the method comprising:
emitting light to a first side of a first substrate;
transmitting the light from a second side of the first substrate opposing the first side of the first substrate, to a second side of a second substrate which faces and overlaps the first substrate in a same direction in which a touch occurs on an upper surface of the first substrate corresponding to the second side of the first substrate;
light receiving elements receiving the light from the second substrate at a first side of the second substrate opposing the second side of the second substrate; and
determining the touch position based on the received light.

25. The method of claim 24, wherein the determining the touch position comprises determining whether the touch occurs or not based on a total sum of changes of signal intensities of the light receiving elements.

26. The method of claim 25, wherein the determining the touch position further comprises determining a touch coordinate of the touch position along an X-axis based on a peak of the changes of the signal intensities of the light receiving elements.

27. The method of claim 25, wherein determining the touch position further comprises determining a touch coordinate of the touch position along a Y-axis based on the number of the light receiving elements which sense the touch, and the changes of the signal intensities of the respective light receiving elements.

* * * * *